(12) United States Patent
Melançon et al.

(10) Patent No.: US 7,731,021 B2
(45) Date of Patent: Jun. 8, 2010

(54) CONVEYOR LINK CHAIN WITH UNIVERSAL COUPLING JOINT

(75) Inventors: Stephen Melançon, Mandeville, LA (US); David Bogle, Destrehan, LA (US); Max C. Salinger, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 3 days.

(21) Appl. No.: 11/720,858

(22) PCT Filed: Dec. 20, 2005

(86) PCT No.: PCT/US2005/046400

§ 371 (c)(1),
(2), (4) Date: Jun. 5, 2007

(87) PCT Pub. No.: WO2006/069163

PCT Pub. Date: Jun. 29, 2006

(65) Prior Publication Data

US 2009/0250325 A1    Oct. 8, 2009

Related U.S. Application Data

(60) Provisional application No. 60/593,193, filed on Dec. 20, 2004.

(51) Int. Cl.
*B65G 17/06* (2006.01)
*B65G 17/08* (2006.01)

(52) U.S. Cl. .................. 198/853; 198/851; 198/852

(58) Field of Classification Search ............... 198/851, 198/852, 853
See application file for complete search history.

(56) References Cited

U.S. PATENT DOCUMENTS

| | | | |
|---|---|---|---|
| 2,646,160 A | 7/1953 | Michna | |
| 2,766,635 A | 10/1956 | Schwartzkopf | |
| 4,294,345 A | 10/1981 | Stauber et al. | |
| 4,513,857 A | 4/1985 | Leach | |
| 5,411,445 A * | 5/1995 | Oda | 474/154 |
| 5,857,562 A | 1/1999 | Evrard | |
| 6,209,716 B1 | 4/2001 | Bogle et al. | |
| 6,250,459 B1 * | 6/2001 | Coen et al. | 198/852 |
| 6,758,328 B2 | 7/2004 | Arai et al. | |
| 6,786,327 B2 | 9/2004 | Ashida et al. | |
| 7,207,434 B2 | 4/2007 | Hartness et al. | |
| 2006/0054471 A1 | 3/2006 | Maeda | |

* cited by examiner

*Primary Examiner*—Gene Crawford
*Assistant Examiner*—Kavel P Singh
(74) *Attorney, Agent, or Firm*—James T. Cranvich (57) ABSTRACT

A conveyor chain with a universal coupling joint connecting consecutive chain links. The joint includes a joint member unitarily molded with a first link body engaged by a separately formed joint element insertable into a second adjacent link body to link the two link bodies at the joint. The insertable joint element may be made of a different material from the link body. The joint member has a convex or concave spherical bearing surface that engages a complementary concave or convex bearing surface on the joint element for universal pivoting.

12 Claims, 5 Drawing Sheets

CONVEYOR LINK CHAIN WITH UNIVERSAL COUPLING JOINT

BACKGROUND

The invention relates generally to power-driven conveyors and, more particularly, to conveyor links coupled together in series at universal joints into a linked chain.

Conveyor chains constructed of a series of connected links are used to convey articles, often in single file, through a plant. In the food processing industry, chain links are often molded out of plastic materials, which offer many advantages in sanitation over metal chain links. In some applications, a chain conveys articles horizontally in a straight line. The joints between consecutive links of a straight-running chain need to pivot only about a horizontal axis perpendicular to the direction of chain travel so that the chain can backbend and articulate about drive sprockets. In other applications, a chain must negotiate turns to one side or the other. In these applications, the chain must be able to rotate about a vertical axis, too. But other applications require that a chain be made to twist about an axis in the direction of chain travel. A universal joint between adjacent chain links gives the chain three degrees of freedom to rotate between consecutive links.

But there are problems associated with universal joints in conveyor chains. Rubbing contact between bearing surfaces at the joints, especially between like materials, can cause the chain to squeak annoyingly. Furthermore, the constant motion between the bearing surfaces can cause premature or uneven wear of the links, requiring their replacement.

Thus, there is a need for a conveyor link chain with a universal joint that runs quietly and offers a longer wear life.

SUMMARY

These needs and others are satisfied by a conveyor link chain that comprises a plurality of conveyor links joined serially into a link chain. Each link includes a link body made of a first material. The link body extends longitudinally from a first end to a second end. An arm that extends outward at the second end of the link body terminates in a distal joint member, which has either a concave or a convex spherical bearing surface. A joint element made of a second material is attached to the first end of the link body. The joint element has a spherical bearing surface that is convex or concave, complementary to the bearing surface of the joint member. The joint member at the second end of a link engages the joint element at the first end of an adjacent link. The convex bearing surface of one is received in the concave bearing surface of the other to form a universal coupling joint connecting adjacent links together into a conveyor link chain.

Another version of conveyor link chain comprises a plurality of conveyor links joined serially into a link chain. Each link includes a link body that extends longitudinally from a first end to a second end. A joint member is unitarily molded with the link body at its second end. The joint member has an arm extending outward of the link body to a concave or convex spherical bearing surface. Retention structure is formed in the first end of the link body. A joint element is retained in place at the first end of the link body by the retention structure. The joint element has a spherical bearing surface complementary to the bearing surface of the joint member. The joint member at the second end of a link engages the joint element attached to the first end of an adjacent link. The convex bearing surface is received in the concave bearing surface to form a universal coupling joint connecting adjacent links together into a conveyor link chain.

Still another version of conveyor link chain is constructed of a plurality of links, each of which extends longitudinally from a first end to a second end. Coupling means connects Adjacent links are connected together at universal joints by coupling means into a conveyor link chain. The coupling means comprises first and second bearing structures. The first bearing structure, which is molded unitarily with a link at its second end, presents a rounded bearing surface. The second bearing structure is formed separately from the link. It is attachable to the first end of the link and presents a rounded bearing surface to engage the bearing surface of the first bearing structure of an adjacent link in interlocked engagement. Thus, the coupling means forms a universal joint coupling adjacent links together into a conveyor link chain.

Yet another version of conveyor link chain comprises a plurality of conveyor links joined serially into a link chain. Each link includes a link body that extends longitudinally from a first end to a second end. The link body includes an arm extending outward at the second end and retention structure at the first end. The arm terminates in a distal joint member that has a concave or convex spherical bearing surface. A joint element is retained in place at the first end of the link body by the retention structure. The joint element has a spherical bearing surface convexly or concavely complementary to the bearing surface of the joint member. The joint member at the second end of a link engages the joint element at the first end of an adjacent link. The convex bearing surface is received in the concave bearing surface of the adjacent link to form a universal coupling joint connecting adjacent links together into a conveyor link chain.

Still another version of chain link conveyor comprises a series of links joined serially into a chain. Each link includes a link body that extends longitudinally from a first end to a second end. The link body includes an arm that extends outward at the second end and terminates in a boss with a convex bearing surface. A receptacle in the interior of the link body opens onto the first end. A bearing element having a wall defining an interior concave bearing surface is received in the receptacle. The arm at the second end of a link extends through a slot formed in the wall of the bearing element at the first end of an adjacent link. The convex bearing surface of the boss contacts the interior concave surface of the bearing element to form a universal coupling joint connecting adjacent links together into a conveyor link chain.

In another version of a conveyor link chain, a plurality of conveyor links are joined serially to form the chain. Each link includes a link body extending longitudinally from a first end to a second end and in thickness from a first side to a second side. Each link body includes a pair of arms that extend outward at the second end. The arms cradle between their distal ends a boss having a convex spherical bearing surface. A bearing element in the form of an L-shaped bracket has a proximal side that extends longitudinally outward at the first end of the link body to a distal side that extends perpendicularly toward the first side of the link. A concave spherical indentation is formed in the distal side. The arms at the second end of a link extend around the distal side of the L-shaped bracket at the first end of an adjacent link. The convex spherical bearing surface of the boss is received in the concave spherical bearing surface of the L-shaped bracket to form a universal coupling joint connecting adjacent links together into a conveyor link chain.

Another version of a conveyor link chain is constructed of a plurality of conveyor links joined serially into a link chain. Each link includes a link body that extends longitudinally from a first end to a second end and in thickness from a first side to a second side. An arm extends outward at the second end of the link body and terminates in a ring having a concave spherical bearing surface formed on the interior of the ring. A platform extends longitudinally outward at the first end. A hole is formed in the platform. A bearing element includes a plate that extends longitudinally outward from the first end of the link body. An axle extends perpendicularly from the plate toward the first side of the link. The distal end of the axle is received in the hole in the platform. A thickened toroidal portion formed on the axle is sized to be received in the interior of the ring. An outer convex spherical bearing surface is formed on the toroidal portion of the axle. The toroidal portion at the first end of a link is received in the interior of the ring at the second end of an adjacent link. The convex spherical bearing surface of the toroidal portion engages the concave spherical bearing surface of the ring to form a universal coupling joint connecting adjacent links together into a conveyor link chain.

Yet another version of a conveyor link chain comprises a plurality of links joined serially into a chain. Each link includes a link body that extends longitudinally from a first end to a second end. A U-shaped projection with a rounded cross section at least in the vicinity of the bend of the U extends outward of the link body to form a closed loop at the second end of the link body. A hook-shaped element is attachable to the link body at its first end. The hook-shaped element has a round cross section at least in the vicinity of the bend of the hook. The hook-shaped element at the first end of a link extends through the closed loop formed at the second end of an adjacent link to form a universal coupling connecting adjacent links together into a conveyor link chain.

BRIEF DESCRIPTION OF THE DRAWINGS

These and other features and aspects of the invention, as well as its advantages, are better understood with reference to the following description, appended claims, and accompanying drawings, in which:

DETAILED DESCRIPTION

Figure 1A:
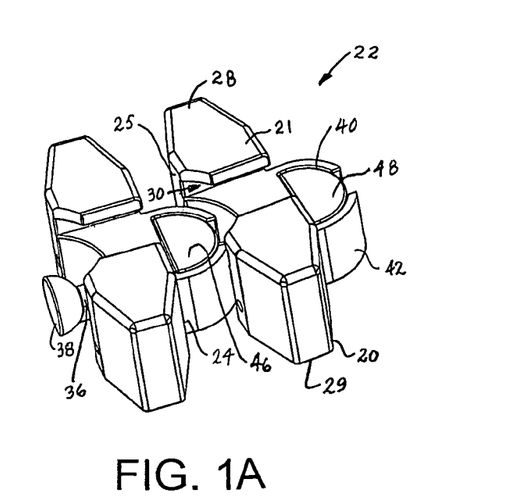
FIGS. 1A, 1B, and 1C are pictorial views of two links of a conveyor chain embodying a first version of a universal coupling joint including a semicylindrical insert, in which the views are taken from three perspectives: laterally above; longitudinally below; and plan above.
Figure 1B:
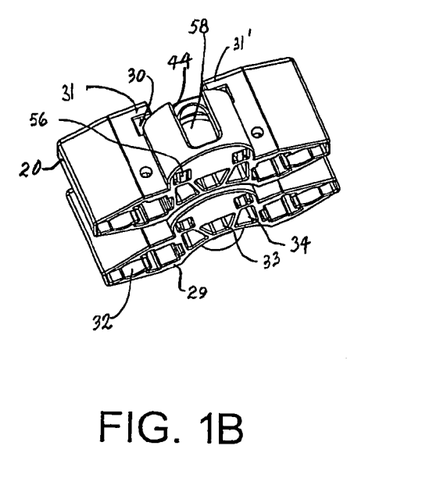
Figure 1C:
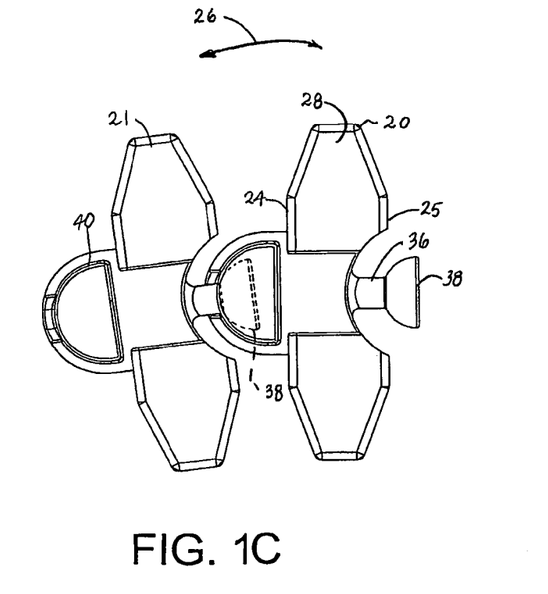

Two links of a conveyor chain embodying features of the invention are shown in FIGS. 1A-1C. Each link 20 of the chain 22 includes a link body 21 that extends longitudinally from a first end 24 to a second end 25 in a direction of chain travel 26. Each link extends in thickness from a first side 28, such as a top side, to an opposite second side 29, such as a bottom. The links shown are designed to be run depending from an inverted-T guide track in an overhead conveyor arrangement. A T-shaped groove 30 is formed by flanking tabs 31, 31' in the top side of each link to receive the guide track (not shown). Voids 32, 33, 34 in the interior of the link open onto the bottom surface. Attachments, such as article-gripping elements, can be attached to the link to structure accessible via the voids. The voids also reduce the weight of the link.

Figure 2:
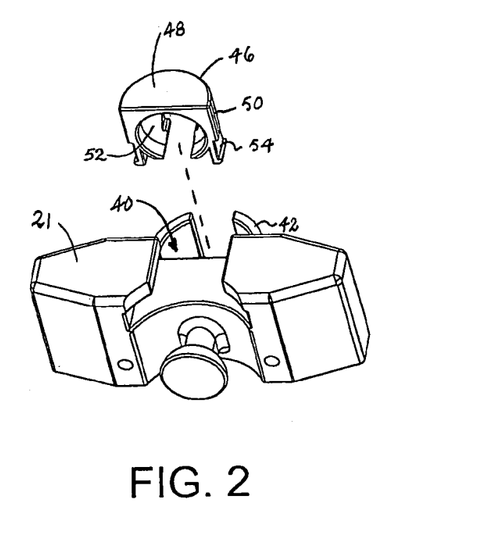
FIG. 2 is an exploded view of one link of the conveyor chain of FIGS. 1A-1C.

To permit the conveyor chain to follow a tortuous path, consecutive links are joined by coupling means in the form of a universal joint. The joint is formed by an arm 36, or stem, extending longitudinally from the link body 21 at its second end 25. The arm terminates in a distal joint member 38 in the form of a hemispherical boss with an outer convex spherical bearing surface. The arm connects to the boss in a polar attachment. Both are unitarily molded with the link body. A receptacle 40 is formed in the first end 24 of the link body by a cylindrical wall 42, which includes a notch 44. The receptacle has a blind end at the bottom side of the link body. Its other end opens toward the top side of the link at the T-shaped groove. An insertable joint element 46 is sized to fit snugly in the receptacle. The joint element has a semicircular floor 48 with walls 50 rising perpendicular from the floor as also shown in FIG. 2. A concave bearing surface 52 is formed on the interior of the wall of the insert 46. Two consecutive links are joined by inserting the boss 38 of one into the receptacle 40 of another with the arm 36 extending through the notch 44 and then inserting the joint element 46 into the receptacle to cover the boss. Tabs 54 on each side of the insert snap in place through openings 56 defining retention structure in the bottom of the link body. The tabs may be manually compressed out of their relaxed locking positions for removal of the joint member. A slot 58 in the wall of the joint element aligns with the notch in the link body to accommodate the arm. The convex bearing surface of the boss bears against the concave bearing surface formed on the interior of the wall of the joint, or bearing, element 46. The oversized boss is retained by the removable joint element to connect consecutive links together in a universal coupling joint capable of pivoting about any axis.

Preferably, the link body is made of a thermoplastic polymer, such as polypropylene, polyethylene, acetal, or a composite material by injection molding. The joint member, including the arm and the boss, are preferably unitarily molded together with the link body in a single molding step. The joint element is preferably molded similarly, but separately, out of a thermoplastic material such as those mentioned or of others. To minimize noise caused by the rubbing of similar materials against each other in the joint as the chain moves along a winding path, the link body and the joint element may be made of different materials. Nylon, for instance, can be used for the insertable joint element and acetal for the link body to provide long wear life and low noise.

Figure 3A:
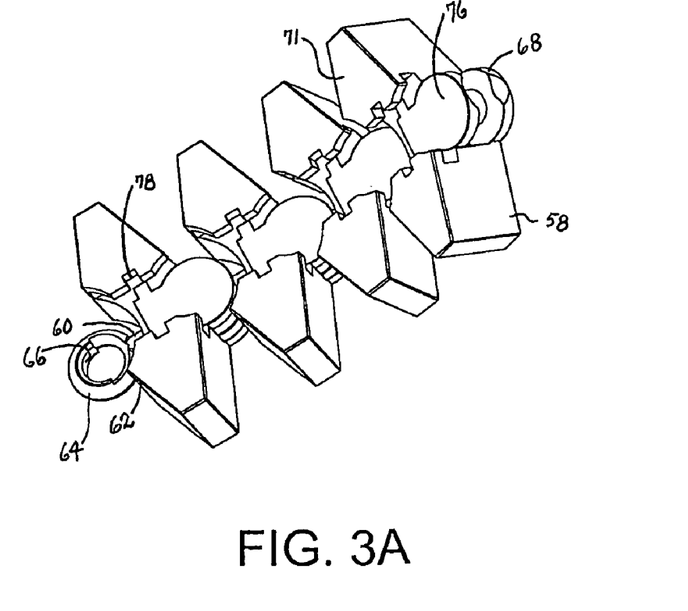
FIGS. 3A and 3B are top and bottom views of a portion of a conveyor chain embodying another version of universal coupling joint including an insert with a toroidal portion surrounding an axle.
Figure 3B:
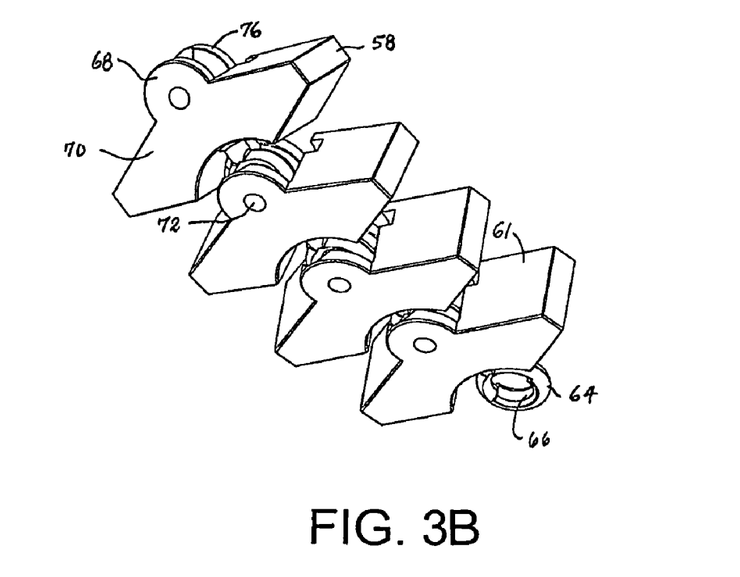
Figure 4:
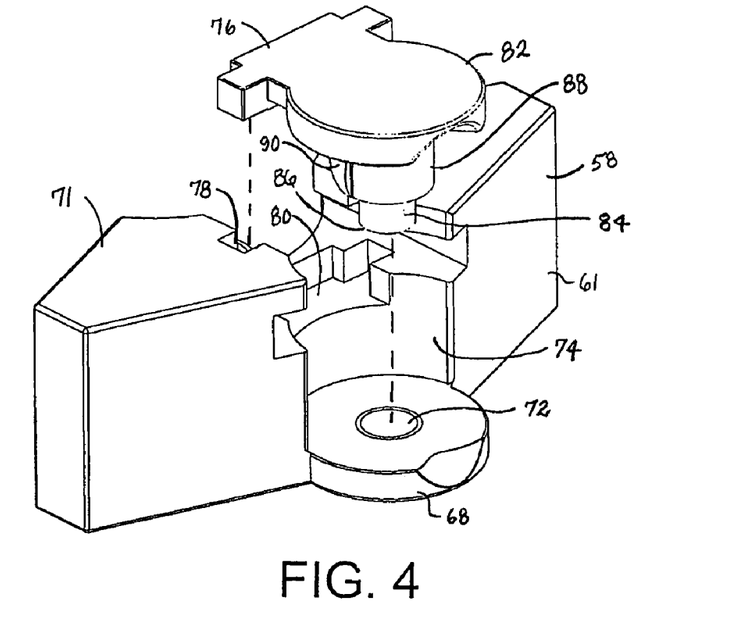
FIG. 4 is an exploded view of a single link of the chain of FIGS. 3A and 3B.
Figure 5:
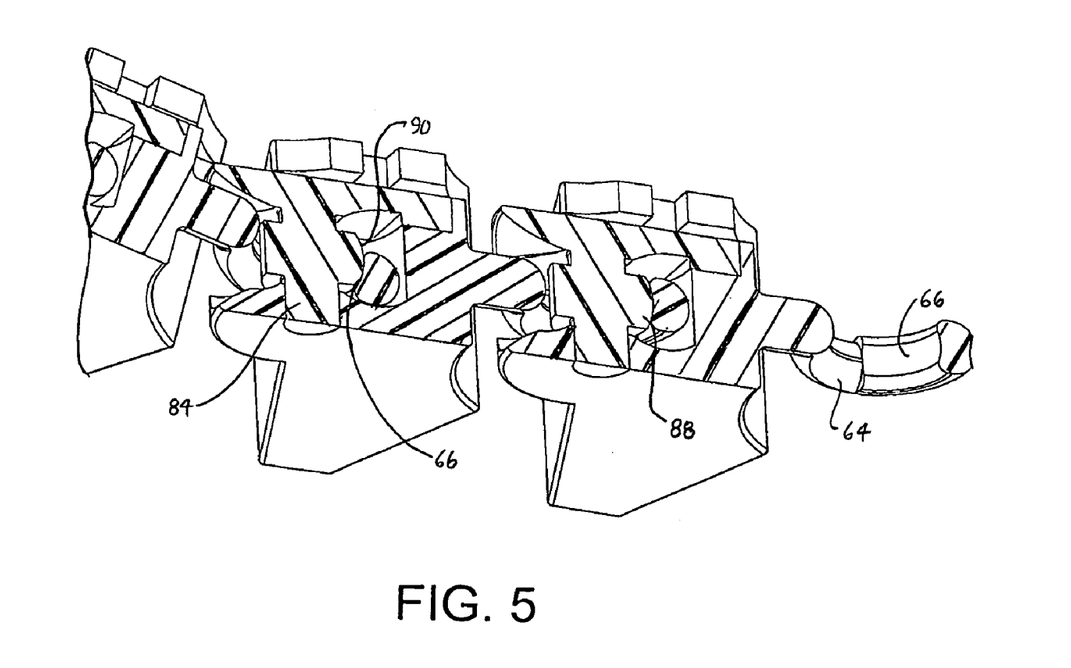
FIG. 5 is a cross sectional view of the chain of FIGS. 3A and 3B cut along a curved surface bisecting the chain laterally along its longitudinal centerline.
Figure 6A:
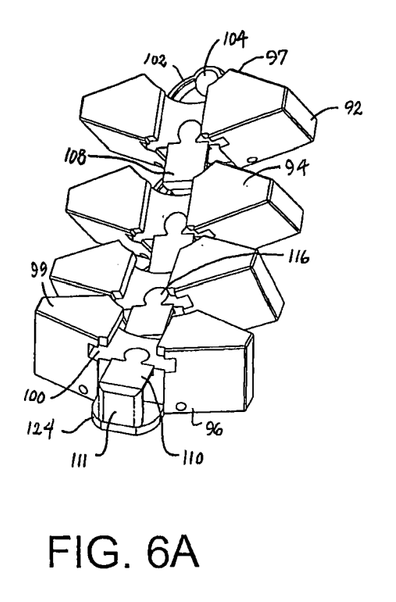
FIGS. 6A and 6B are top and bottom views of a portion of a conveyor chain embodying another version of universal coupling joint including an insert with a concave indentation.
Figure 6B:
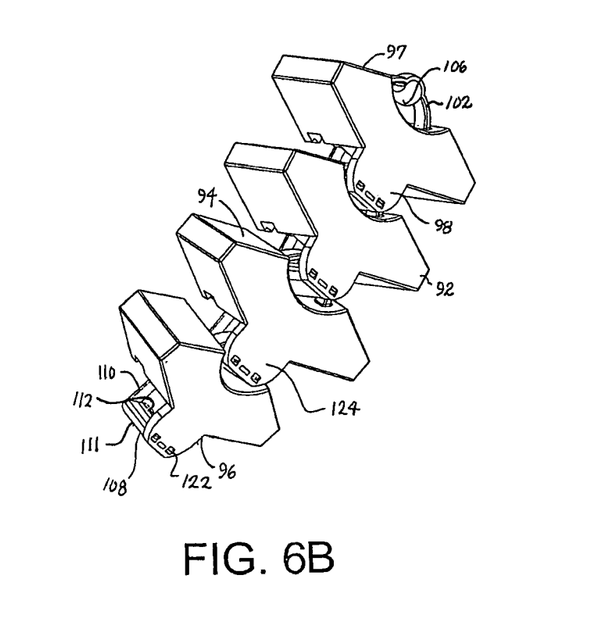
Figure 7:
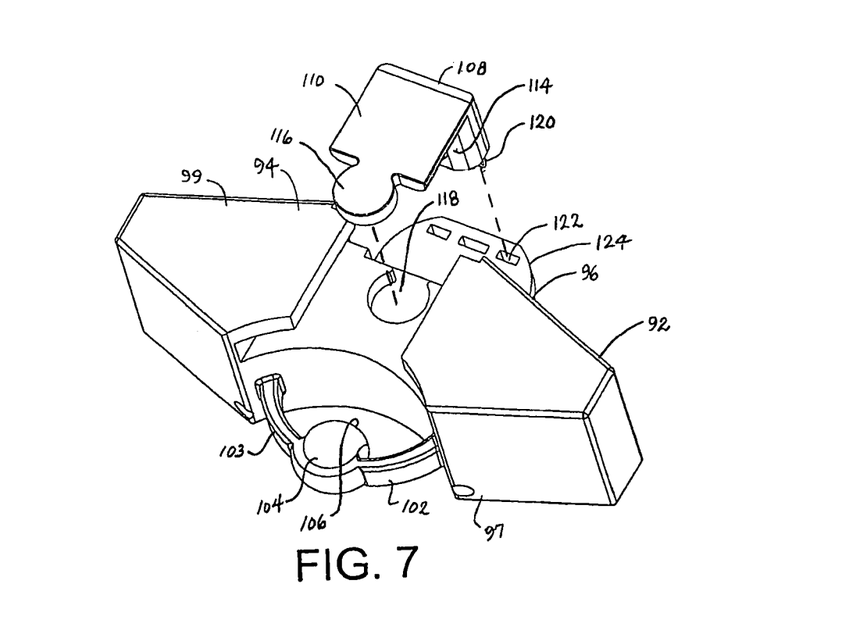
FIG. 7 is an exploded view of a single link of the chain of FIGS. 6A and 6B.

A link chain with another version of universal coupling joint is shown in FIGS. 3A and 3B. Each link body 58 is generally formed the same as the link body in FIG. 2. The major structural differences from the link of FIG. 2 reside in the coupling means. The joint member includes an arm 60 extending outward at a second end 62 of the link body to a ring 64 connected to the distal end of the arm. A concave spherical bearing surface 66 is formed on at least a portion of the interior of the ring. As also shown in FIG. 4, a platform 68 extends longitudinally outward from a first end 62 at a second side 70, such as the bottom, of the link body. A hole 72 is formed centrally in the semicircular platform. A cylindrical cavity 74 is formed in the interior of the link body. A chain is constructed of these links by first seating the ring of the link on the platform within the interior cavity 74 and then installing a bearing element 76 into the link body from a first side 71. Notches 78 in the first side admit tabs on the bearing element into a seat 80 formed in the interior of the link body. The bearing, or joint, element insert 76 may be retained in place by gluing, welding, or bonding, or may include releasable locking tabs that mate with retention structure in the interior of the link body. The bearing element consists of a circular plate 82 that extends longitudinally outward from the first end of the link body. An axle 84 extends perpendicularly from the plate to a distal end 86 that is received in the hole 72 when the bearing element insert is installed. A thickened toroidal portion 88 formed around the axle is sized to be received in the interior of the ring of an adjacent link. A convex spherical bearing surface 90 is formed along at least a portion of the outer periphery of the toroidal portion. As shown in FIG. 5, the coupling joint is provided with universal rotation by the engagement of the convex bearing surface 90 of the toroid 88 with the complementary concave bearing surface 66 on the interior of the ring 64.

Preferably, the joint member including the ring and the arm is unitarily molded with the link body. The bearing element is preferably a separately molded, insertable element that may be made of a different material from the link body.

A conveyor chain with another version of link coupling means is shown in FIGS. 6A, 6B, 7, and 8. Each link 92, except for the coupling joint, is structurally similar to the links in FIGS. 1 and 3. A central link body 94 extends longitudinally from a first end 96 to a second end 97 and in thickness from a first side 98 to a second side 99. A T-shaped groove 100 at the second side receives a T-shaped guide track on which the chain runs. A pair of arms 102, 103 extend outward at the second end of the link body. A boss 104 with a convex spherical bearing surface 106 is cradled by the arms at their joined distal ends. The arms and the boss are preferably unitarily molded with the link body. A separately molded bearing element 108, which may be made of a different material from the link body, is in the form of an L-shaped bracket having a proximal side that extends longitudinally outward of the first end of the link body when the bracket is inserted in place. Extending toward the first side of the link body perpendicular to the proximal side of the L-bracket is a distal side 111. A concave indentation 112 is formed in the interior wall 114 of the distal side of the L-bracket to form a bearing surface for the boss. The proximal side of the bracket includes a head 116 that, like a puzzle piece, sits in a mating recessed seat 118 formed at the base of the T-shaped groove. The head may be press-fit, glued, molded, or bonded in place in the belt. Tabs 120 at the distal end of the distal side of the bracket snap in place in openings 122 in a platform 124 extending longitudinally outward at the first end of the link body. Tangs on the tabs extend through the opening and engage undercut structure bounding the openings to removably lock in place.

Figure 8:
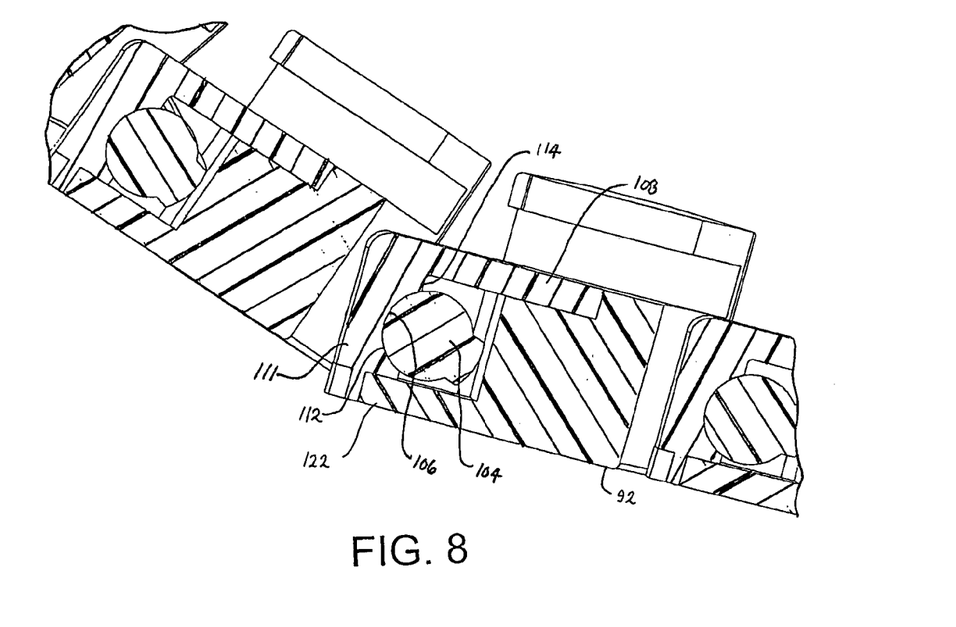
FIG. 8 is a cross sectional view of the chain of FIGS. 6A and 6B cut along a curved surface bisecting the chain laterally along its longitudinal centerline.

A conveyor chain is formed by first placing the first end of a first link adjacent to the second end of a consecutive second link such that the boss 104 of the second link is centered above the platform 124 of the first link. Then the L-shaped bracket is installed in the first link surrounded by the arms of the second link to retain the boss of the second link against the concave indentation in the bracket. This coupling means forms a universal joint connecting consecutive links in a conveyor chain. As shown in FIG. 8, the convex surface 106 of the boss 104 bears against the concave indentation 112 formed in the distal side 111 of the bracket and permits pivotal motion along any axis.

Figure 9:
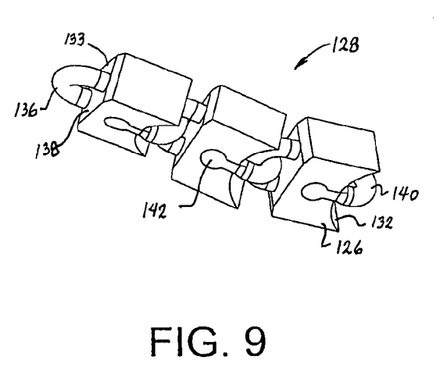
FIG. 9 is a bottom view of a portion of a conveyor chain embodying yet another version of universal coupling joint including a hook-shaped insert.
Figure 10:
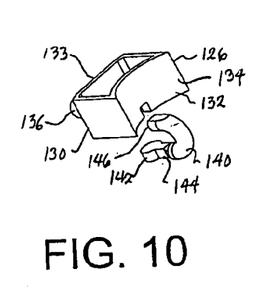
FIG. 10 is an exploded view of a single link of a chain as in FIG. 9.

Still another conveyor chain embodying another version of coupling means is illustrated in FIG. 9. Three links 126 of a chain 128 are shown. Each link has a link body 130 that extends from a first end 132 to a longitudinally opposite second end 133. The first end is characterized by a concave curved face 134. Unitarily molded with the link body at its second end is a U-shaped projection 136 that forms a closed loop with a flat face 138 of the link body. The U-shaped projection has a rounded, such as a circular, cross section at least in the vicinity of its bend. A hook-shaped element 140 is attachable at the first end of the link body. The hook-shaped element also has a rounded cross section in the vicinity of its bend. When a chain is constructed of these links, the U-shaped projection of a first link is positioned against the concave curved face of an adjacent second link. Then the hook-shaped element is threaded through the closed loop formed by the U-shaped element of the first link and inserted into the second link body to connect consecutive links together. A head 142 at the end of a shank portion 144 of the hook-shaped element fits puzzle-like into a complementary cavity formed in the link body. The distal end 146 of the hook rests against the concave face of the link body. Both ends of the hook may be attached to the link body by press-fitting, bonding, or other means of attachment. The U-shaped projection and the hook form two links as in a conventional metal chain. The two contacting rounded surfaces form a universal coupling joint between consecutive modules.

Although the invention has been described with reference to a few preferred versions, much of the structure of the links described is immaterial to the structure of the coupling joints. For example, some of the examples refer to overhead chain, while the last example does not. Clearly, the joint described with reference to FIG. 9 could be used in an overhead chain. Likewise, the joints shown in the first three examples of overhead chain are useable in other types of conveyor chain that are not suspended from overhead tracks, but that are, for example, supported from below in tracks and have top article-conveying surfaces. That's why any references to top and bottom used in the description are merely for purposes of simplifying the description of the relative positions of components on the links, not to indicate a geodetic orientation. Thus, the scope and spirit of the claims are not meant to be limited to the details of the examples described.

What is claimed is:
1. A conveyor link chain comprising:
 a plurality of links, wherein each link extends longitudinally from a first end to a second end;
 coupling means for connecting adjacent links together at universal joints into a conveyor link chain;
 wherein the coupling means comprises:
  first bearing structure molded unitarily with a link at the second end of the link and presenting a concave or a convex spherical bearing surface;
  second bearing structure formed separately from the link, but attachable to the first end of the link and presenting a complementary convex or concave bearing surface to engage the bearing surface of the first bearing structure of an adjacent link to form a univer- sal coupling joint connecting adjacent links together into a conveyor link chain;

wherein each link includes a platform extending longitudinally outward at the first end with a hole formed in the platform and wherein the first bearing structure includes an arm that extends outward at the second end and terminates in a ring having a concave spherical bearing surface that forms the spherical bearing surface of the first bearing element on the interior of the ring and wherein the second bearing structure includes a plate extending longitudinally outward at the first end of the link body, an axle extending from the plate perpendicularly toward the first side of the link and received at a distal end in the hole in the platform, and a thickened toroidal portion formed around the axle and sized to be received in the interior of the ring, the thickened toroidal portion defining an outer convex spherical bearing surface that forms the spherical bearing surface of the second bearing structure, wherein the thickened toroidal portion of the axle at the first end of a link is received in the interior of the ring at the second end of an adjacent link with the convex spherical bearing surface of the thickened toroidal portion received in the concave spherical bearing surface of the ring.

2. A conveyor link chain as in claim 1 wherein the second bearing structure is made of a different material from that of the first bearing structure.

3. A conveyor link chain as in claim 1 wherein each link includes retention structure formed in the first end of the link and wherein the second bearing structure is insertable into the first end of the link body and retained in place by engagement with the retention structure.

4. A conveyor link chain comprising:
a plurality of links, wherein each link extends longitudinally from a first end to a second end;
coupling means for connecting adjacent links together at universal joints into a conveyor link chain;
wherein the coupling means comprises:
first bearing structure molded unitarily with a link at the second end of the link and presenting a rounded bearing surface;
second bearing structure formed separately from the link, but attachable to the first end of the link and presenting a rounded bearing surface to engage the bearing surface of the first bearing structure of an adjacent link in interlocked engagement forming a universal coupling joint connecting adjacent links together into a conveyor link chain;
wherein each link includes a receptacle in the interior of the link opening onto the first end and wherein the first bearing structure includes an arm that extends outward at the second end and terminates in a boss defining the rounded bearing surface as convex and wherein the second bearing structure is received in the receptacle and includes a wall defining the rounded bearing surface as concave and forms a slot in the wall, wherein the arm at the second end of each link extends through the slot in the wall of the second bearing element at the first end of an adjacent link with the convex rounded bearing surface of the boss in contact with the interior concave rounded bearing surface of the second bearing structure.

5. A conveyor link chain as in claim 4 wherein the second bearing structure is made of a different material from that of the first bearing structure.

6. A conveyor link chain as in claim 4 wherein the rounded bearing surface of the first bearing structure is complementary to the rounded bearing surface of the second bearing structure.

7. A conveyor link chain as in claim 4 wherein the first bearing structure includes an arm extending outward at the second end of the link that terminates in a distal joint member forming the rounded bearing surface of the first bearing structure.

8. A conveyor link chain as in claim 4 wherein each link includes retention structure formed in the first end of the link and wherein the second bearing structure is insertable into the first end of the link body and retained in place by engagement with the retention structure.

9. A conveyor link chain comprising:
a plurality of links, wherein each link extends longitudinally from a first end to a second end;
coupling means for connecting adjacent links together at universal joints into a conveyor link chain;
wherein the coupling means comprises:
first bearing structure molded unitarily with a link at the second end of the link and presenting a concave or a convex spherical bearing surface;
second bearing structure formed separately from the link, but attachable to the first end of the link and presenting a complementary convex or concave bearing surface to engage the bearing surface of the first bearing structure of an adjacent link to form a universal coupling joint connecting adjacent links together into a conveyor link chain;
wherein the first bearing structure includes a pair of arms that extend outward at the second end of the link and cradle between their distal ends a boss defining the spherical bearing surface of the first bearing structure as convex and wherein the second bearing structure includes an L-shaped bracket having a proximal side extending longitudinally outward at the first end of the link to a perpendicularly extending distal side with a concave spherical indentation forming the complementary spherical bearing surface of the second bearing structure, wherein the arms at the second end of a link extend around the distal side of the L-shaped bracket at the first end of an adjacent link with the convex spherical bearing surface of the boss received in the concave spherical bearing surface of the L-shaped bracket.

10. A conveyor link chain comprising:
a plurality of links, wherein each link extends longitudinally from a first end to a second end;
coupling means for connecting adjacent links together at universal joints into a conveyor link chain;
wherein the coupling means comprises:
first bearing structure molded unitarily with a link at the second end of the link and presenting a rounded bearing surface;
second bearing structure formed separately from the link, but attachable to the first end of the link and presenting a rounded bearing surface to engage the bearing surface of the first bearing structure of an adjacent link in interlocked engagement forming a universal coupling joint connecting adjacent links together into a conveyor link chain;
wherein the first bearing structure includes a pair of arms extending outward at the second end that cradle between their distal ends a boss defining the rounded bearing surface of the first bearing structure as convex and wherein the second bearing structure includes an L-shaped bracket having a proximal side extending longitudinally outward at the first end of the link to a perpendicularly extending distal side with a concave indentation forming the rounded bearing surface of the second bearing structure, wherein the arms at the second end of a link extend around the distal side of the L-shaped bracket at the first end of an adjacent link with the convex rounded bearing surface of the boss received in the concave rounded bearing surface of the L-shaped bracket.

11. A conveyor link chain comprising:
a plurality of links, wherein each link extends longitudinally from a first end to a second end;
coupling means for connecting adjacent links together at universal joints into a conveyor link chain;
wherein the coupling means comprises:
  first bearing structure molded unitarily with a link at the second end of the link and presenting a rounded bearing surface;
  second bearing structure formed separately from the link, but attachable to the first end of the link and presenting a rounded bearing surface to engage the bearing surface of the first bearing structure of an adjacent link in interlocked engagement forming a universal coupling joint connecting adjacent links together into a conveyor link chain;
wherein each link includes a platform extending longitudinally outward at the first end with a hole formed in the platform and wherein the first bearing structure includes an arm that extends outward at the second end and terminates in a ring having a concave bearing surface that forms the rounded bearing surface of the first bearing element on the interior of the ring and wherein the second bearing structure includes a plate extending longitudinally outward at the first end of the link body, an axle extending from the plate perpendicularly toward the first side of the link and received at a distal end in the hole in the platform, and a thickened toroidal portion formed around the axle and sized to be received in the interior of the ring, the thickened toroidal portion defining an outer convex bearing surface that forms the rounded bearing surface of the second bearing structure, wherein the thickened toroidal portion of the axle at the first end of a link is received in the interior of the ring at the second end of an adjacent link with the convex rounded bearing surface of the thickened toroidal portion received in the concave rounded bearing surface of the ring.

12. A conveyor link chain comprising:
a plurality of links, wherein each link extends longitudinally from a first end to a second end;
coupling means for connecting adjacent links together at universal joints into a conveyor link chain;
wherein the coupling means comprises:
  first bearing structure molded unitarily with a link at the second end of the link and presenting a rounded bearing surface;
  second bearing structure formed separately from the link, but attachable to the first end of the link and presenting a rounded bearing surface to engage the bearing surface of the first bearing structure of an adjacent link in interlocked engagement forming a universal coupling joint connecting adjacent links together into a conveyor link chain;
wherein the first bearing structure includes a U-shaped projection that extends outward at the second end to form a closed loop with the link and that has a rounded cross section at least in the vicinity of the bend of the U-shaped projection and wherein the second bearing structure includes a hook-shaped element attachable to the link at the first end that has a rounded cross section at least in the vicinity of the bend of the hook-shaped element, wherein the hook-shaped element at the first end of a link extends through the closed loop formed at the second end of an adjacent link.

* * * * *